N. HOTZ.
Faucet.
No. 127,883.
Patented June 11, 1872.
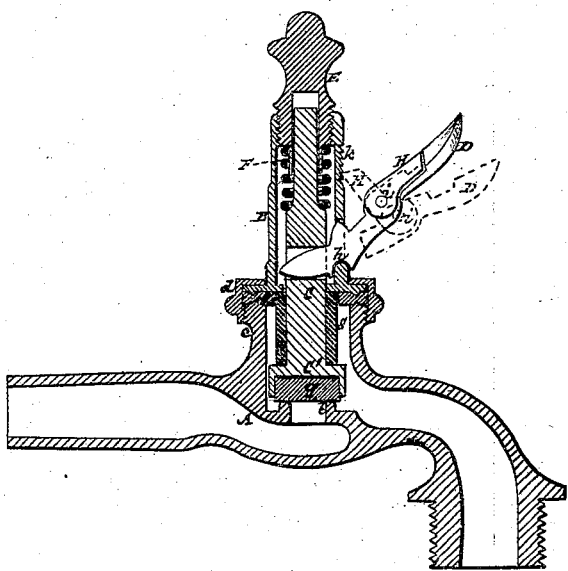
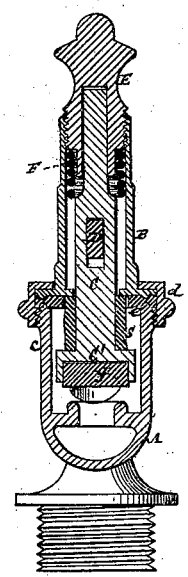
Witnesses:
Nicholas Hotz 127,883

UNITED STATES PATENT OFFICE.

NICHOLAS HOTZ, OF GREENPOINT, BROOKLYN, NEW YORK.

IMPROVEMENT IN FAUCETS.

Specification forming part of Letters Patent No. 127,883, dated June 11, 1872.

Specification describing an Improvement in Faucets, the invention of NICHOLAS HOTZ, of Greenpoint, Brooklyn, in the county of Kings and State of New York.

The invention consists in a novel construction and combination of the operating portions of a faucet, or certain of them, whereby leakage is effectually prevented, and increased durability is insured with great facility of repair, and the valve, which is self-closing, may have its pressure against the seat regulated to the pressure of the fluid the faucet is used to draw off; also, the faucet may be locked in an open position for any given discharge, as required.

In the accompanying drawing, which forms part of this specification, Figure 1 represents a longitudinal sectional elevation of my improved faucet, and Fig. 2 a transverse vertical section thereof through the stem of the faucet.

Similar letters of reference indicate corresponding parts in both figures of the drawing.

A is the body of the faucet, which has formed in it a raised annular valve-seat, $b$, and above said seat an exterior tubular extension, $c$, having a screw-thread on its upper end for attachment, by a coupling-nut, $d$, of a flanged outwardly-extending socket, B. The bottom of the socket and top of the body are beaded and a packing, $e$, introduced between them to make a close joint. This socket B is constructed to form, at its base, a lower guide for the stem C of the valve C'. Said socket B may either be made entire or in sections, and is capable of being turned for the purpose of arranging the handle D, by which the valve is raised in any desired position around the axial line of the valve-stem, thus changing the relation of the handle to the nozzle of the faucet. For basin-faucets the body A might be wholly in line with the stem. The valve C' is of cupped construction, so as to receive within it a facing, $g$, of India rubber or other suitable soft or flexible material, said facing being of sufficient area so that when the valve is brought down the raised annular seat $b$, that should be rounded on its edge, will embed itself in the rubber. Arranged around the lower portion of the stem C of the valve, between the valve and the base of the socket, is a sleeve, S, also made of India rubber or other suitable elastic material, and which serves to prevent leakage through the lower guide of the valve-stem; also acts in part as a spring to close the valve, it being compressed when the valve is raised. Both this sleeve S and the valve-facing $g$ may readily be removed and be replaced by other like pieces, as wear or repair renders necessary. The stem C of the valve extends up through the socket B and fits at its upper end within a top guide, E. This guide, in addition to steadying the valve-stem, also serves as a means of regulating the closing force of the valve, to which end said guide is made adjustable by screwing it in or out of the upper end of the socket, so as to increase or diminish the force of a valve-closing spring, F, interposed between the inner end of the guide and a shoulder on the valve-stem. In this way the closing force of the valve may be adjusted to the varying pressure of the fluid acting against the valve to open it, whereby all unnecessary or excessive pressure of the valve on its seat is avoided. The valve-stem C is recessed or slotted to receive within it the operating end of the lever-handle D, by which the valve is raised or opened. This lever projects through an opening in the socket B, and has its fulcrum upon the lower edge of said opening, for which purpose it is notched, as at $h$, and is otherwise so shaped as to admit, when putting the faucet together, of its being entered within the socket, and so that its notch $h$ straddles the lower edge of the opening in the socket, but so that it cannot be withdrawn without taking the faucet apart. This dispenses with a fulcrum-pin or fast attachment of the lever. Said lever, which is a thumb one, has pivoted to it, at $i$, a dog, H, which, when thrown down or back may form a portion of the thumb-surface, on which pressure is applied to open the valve, but which, when thrown up or forward, as shown by dotted lines in Fig. 1, serves to hold the valve open by dropping into any one of a series of notches, $k$, according to the amount of discharge it is required to keep up.

Thus the valve may either be kept open only by continued pressure on the thumb-lever, or it may be locked in an open position, as desired.

What is here claimed, and desired to be secured by Letters Patent, is—

The combination of the guide E, valve-stem C, spring F, elastic sleeve S, lever D, pawl H, rack k, and socket B, valve C' and its seats b, with the body A of the faucet, all arranged as shown and described.

NICHOLAS HOTZ.

Witnesses:
FRED. HAYNES,
R. E. RABEAU.